H. BARNES.
Cultivator.
No. 54,280.
Patented May 1, 1866.
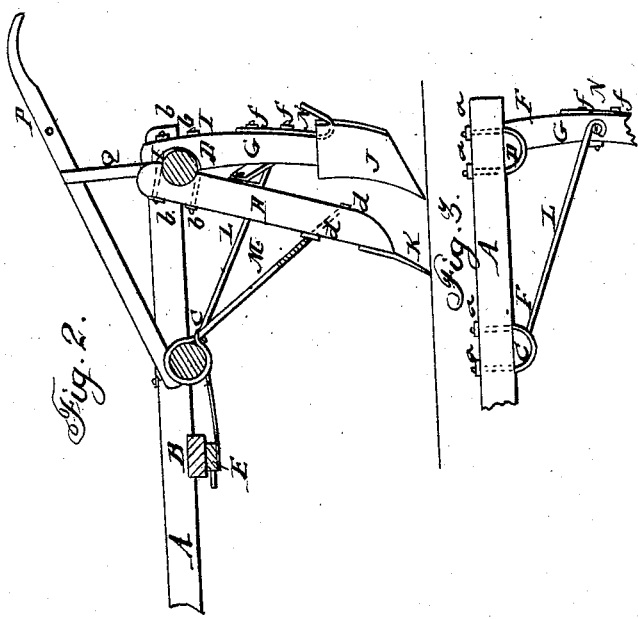
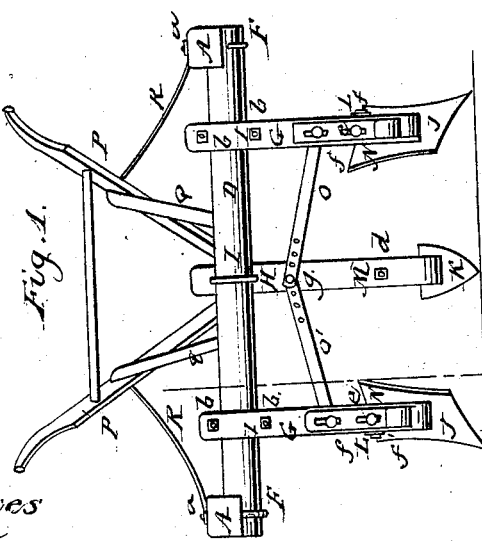

UNITED STATES PATENT OFFICE.

HENRY BARNES, OF BURLINGTON, WISCONSIN.

IMPROVEMENT IN CULTIVATORS.

Specification forming part of Letters Patent No. 54,280, dated May 1, 1866.

*To all whom it may concern:*

Be it known that I, HENRY BARNES, of Burlington, in the county of Racine and State of Wisconsin, have invented a new and Improved Cultivator; and I do hereby declare that the following is a full, clear, and exact description thereof, which will enable others skilled in the art to make and use the same, reference being had to the accompanying drawings, forming part of this specification, in which—

Figure 1 is a rear elevation of my invention; Fig. 2, a side sectional view of the same, taken in the line $x\,x$, Fig. 1; Fig. 3, a side view of a portion of the same.

Similar letters of reference indicate like parts.

This invention consists in an improved mode of constructing the cultivator, whereby strength and durability with lightness is obtained and the adjustment of the plow-standards rendered extremely simple.

A A represent two thills, which are connected at a suitable distance apart by three cross-pieces, B C D, the front cross-piece, B, being of rectangular form in its transverse section and having the whiffletree E attached to its under side. The two rear cross-pieces, C D, are of cylindrical form, and they are chamfered off at their upper surfaces at each end, so as to abut snugly against the under sides of the thills, and they are firmly secured thereto by clips F, which pass around them and up through the thills, and have screw-nuts $a$ on their upper ends. (See Figs. 1 and 3.)

G G H are the plow-standards, the front sides of the upper parts of which have semicircular recesses in them to receive the rear cross-piece, D, the standards being secured to said cross-piece by clips I, which pass round D and through the standards and have screw-nuts $b$ on them.

The two side-plow standards G G have two furrow-plows, J, attached to them, and the central standard is provided with an ordinary shovel-plow, K. The standards G G are braced by rods L, which are attached to their outer sides, said rods having their upper ends turned around the cross-piece C and secured by a twist, $c$, as shown in Fig. 2.

The central standard, H, is braced by a rod, M, the upper end of which is secured to C in the same manner, and has its lower end passing through H, with two screw-nuts, $d\,d$, upon it, one of which bears against the front, and the other against the rear, side of said standard.

By this mode of attaching the plow-standards to the cross-piece D—to wit, by the clips—the plows may be readily adjusted at a greater or less distance apart and the standards shifted from one side of the machine to the other, so that the plows J may throw the earth toward or from the plants 3; and by having the brace-rods L L attached to the outer sides of the standards G G the latter are prevented from being twisted and strained by the points of the plow J coming in contact with obstructions; and by having the brace-rod M of the central plow-standard, H, fitted to the latter, as described, the plow K may be readily adjusted higher or lower to penetrate the earth at a greater or less depth, as may be desired.

By having the cross-pieces C D attached to the thills A A through the medium of the clips F all mortises and tenons, which tend to weaken the framing, are avoided.

At the rear of the standards G G there are attached gages N N, constructed of plates bent outward or backward at their lower ends, and having oblong holes $e$ made in their upper parts, through which screws $f$ pass into the standards. By this mode of attachment the gages may be readily adjusted higher or lower, according to the depth of furrows required.

The standards G G H are connected by bars O O, the inner parts of which are provided with a series of holes, through any of which a screw, $g$, passes into the central standard, H, the outer ends of said bars being attached to the standards G G.

P P are the handles, the front ends of which are attached to the cross-piece C and braced by uprights Q from the rear cross-piece, D, and by bars R from the thills A.

Having thus described my invention, I claim as new and desire to secure by Letters Patent—

The combination and arrangement of the thills A, standards G H, cross-pieces C D, rods L M, and connecting-bars O, constructed and employed in the manner and for the purposes specified.

The above specification of my invention signed by me this 14th day of June, 1865.

HENRY BARNES.

Witnesses:
  CASPER PLATE,
  HIRAM A. SHELDON.